(12) United States Patent
Van Es et al.

(10) Patent No.: US 11,644,481 B2
(45) Date of Patent: May 9, 2023

(54) ATOMIC FORCE MICROSCOPY CANTILEVER, SYSTEM AND METHOD

(71) Applicant: Nederlandse Organisatie voor toegepast-natuurwetenschappelijk onderzoek TNO, 's-Gravenhage (NL)

(72) Inventors: Maarten Hubertus Van Es, Voorschoten (NL); Hamed Sadeghian Marnani, Nootdorp (NL)

(73) Assignee: Nederlandse Organisatie voor toegepast-nataurwetenschappelijk onderzoek TNO, 's-Gravenhage (NL)

( * ) Notice: Subject to any disclaimer, the term of this patent is extended or adjusted under 35 U.S.C. 154(b) by 44 days.

(21) Appl. No.: 17/493,015

(22) Filed: Oct. 4, 2021

(65) Prior Publication Data

US 2022/0026464 A1   Jan. 27, 2022

Related U.S. Application Data

(63) Continuation of application No. 16/641,540, filed as application No. PCT/NL2018/050551 on Aug. 23, 2018, now abandoned.

(30) Foreign Application Priority Data

Aug. 24, 2017   (EP) .................................... 17187809

(51) Int. Cl.
*G01Q 60/38*   (2010.01)
*G01Q 60/24*   (2010.01)
(Continued)

(52) U.S. Cl.
CPC ............. *G01Q 60/38* (2013.01); *G01Q 20/04* (2013.01); *G01Q 70/10* (2013.01); *G01Q 70/14* (2013.01)

(58) Field of Classification Search
CPC .......... G01Q 60/24; G01Q 60/38; G01Q 70/10
See application file for complete search history.

(56) References Cited

U.S. PATENT DOCUMENTS

| 5,646,339 | A | 7/1997 | Bayer et al. |
| 2007/0044545 | A1 | 3/2007 | Beyder et al. |
| 2011/0041223 | A1* | 2/2011 | Jesse ...................... B82Y 35/00 850/5 |

FOREIGN PATENT DOCUMENTS

| EP | 2163907 A2 | 3/2010 |
| TW | I388834 B | 3/2013 |

(Continued)

OTHER PUBLICATIONS

Van Es et al., "Mapping buried nanostructures using subsurface ultrasonic resonance force microscopy," *Ultramicroscopy*, 184:209-216 (2018).

(Continued)

*Primary Examiner* — Eliza W Osenbaugh-Stewart
(74) *Attorney, Agent, or Firm* — Leydig, Voit & Mayer, Ltd.

(57) ABSTRACT

The surface of the atomic force microscopy (AFM) cantilever is defined by a main cantilever body and an island. The island is partly separated from the main body by a separating space between facing edges of the main body and the island. At least one bridge connects the island to the main body, along a line around which the island is able to rotate through torsion of the at least one bridge. The island has a probe tip located on the island at a position offset from said line and a reflection area. In an AFM a light source directs light to the reflection area and a light spot position detector detects a displacement of a light spot formed from light reflected by the reflection area, for measuring an effect of forces exerted on the probe tip.

18 Claims, 4 Drawing Sheets

(51) Int. Cl.
  *G01Q 70/10* (2010.01)
  *G01Q 20/04* (2010.01)
  *G01Q 70/14* (2010.01)

(56) References Cited

FOREIGN PATENT DOCUMENTS

| TW | I416110 | 11/2013 |
| WO | WO 00/46569 A1 | 8/2000 |
| WO | WO 2007/024711 A2 | 3/2007 |

OTHER PUBLICATIONS

Sadewasser et al., "Special cantilever geometry for the access of higher oscillation modes in atomic force microscopy," *Applied Physics Letter*, vol. 89, 033106 (2006).
Rahaeifard et al., "Sensitivity Analysis of Atomic force Microscope Cantilever Made of Functionally Graded Materials," Proceedings of the ASME 2009 IDETC/CIE, San Diego, USA, DETC2006-86254, pp. 1-6 (Aug. 30-Sep. 2, 2009).
Pedersen, "Design of Cantilever Probes for Atomic Force Microscopy (AFM)," *Engineering Opt.*, 32(3): 373-392 (2000).

\* cited by examiner

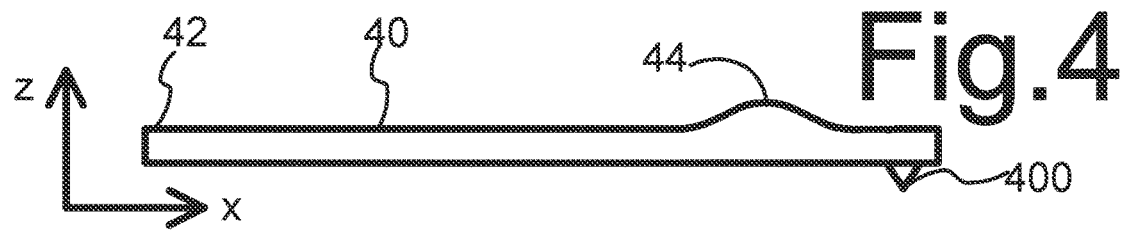
Fig.4
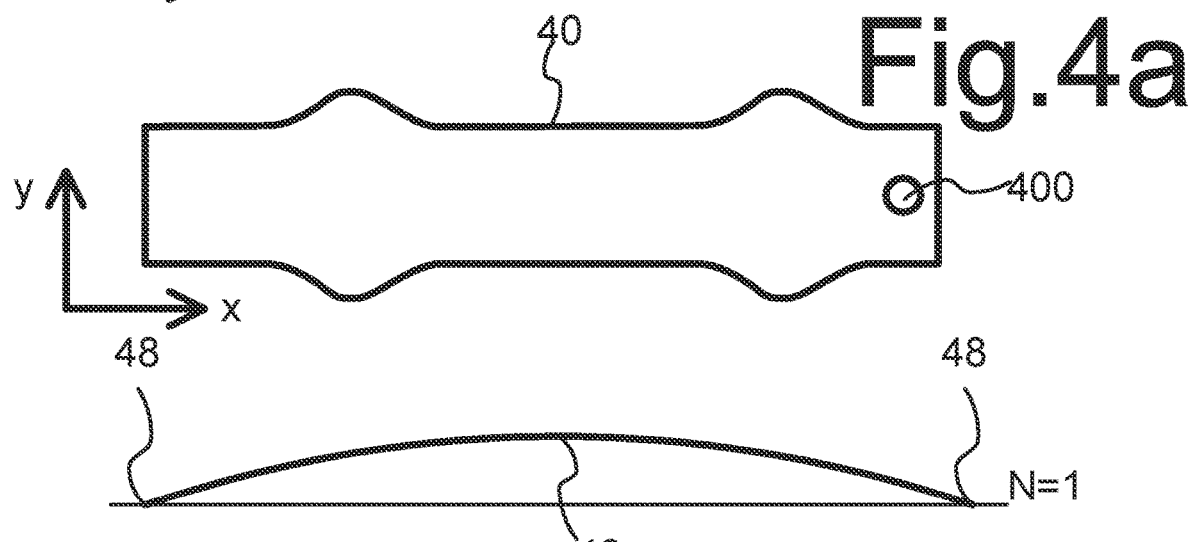
Fig.4a
Fig.4b
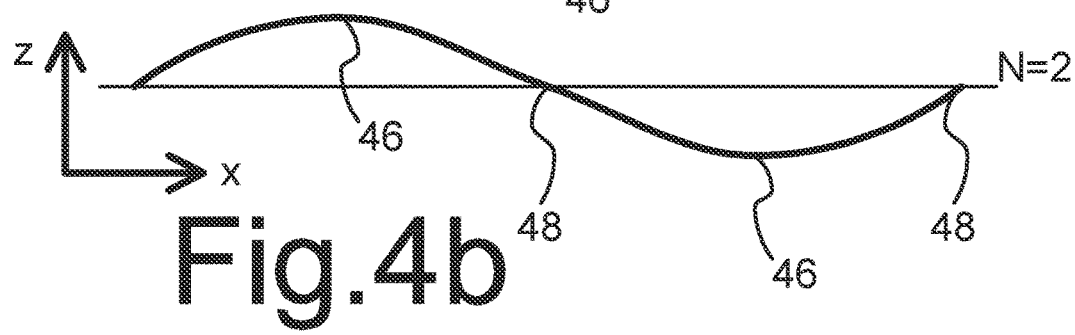
Fig.5
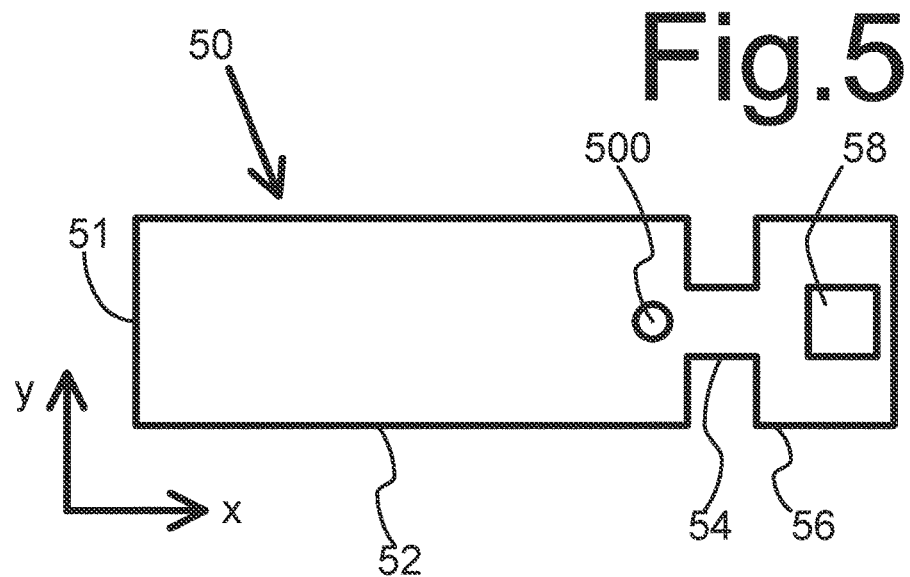

ATOMIC FORCE MICROSCOPY CANTILEVER, SYSTEM AND METHOD

CROSS-REFERENCE TO RELATED APPLICATIONS

This patent application is a continuation of U.S. application Ser. No. 16/641,540, filed Feb. 24, 2020, which is a U.S. National Phase of PCT International Application No. PCT/NL2018/050551, filed Aug. 23, 2018, which claims priority to European Application No. EP17187809.3, filed Aug. 24, 2017, which are both expressly incorporated by reference in their entireties, including any references contained therein.

FIELD OF THE INVENTION

The invention relates to a cantilever for use in an atomic force microscopy system, to an atomic force microscopy system and an atomic force microscopy method.

BACKGROUND

Atomic Force Microscopy (AFM) can be used to form images of sample surfaces. Moreover, it is known to map structures buried below the surface using AFM. In an article titled "Detection of buried reference structures by use of atomic force acoustic microscopy" by A. Striegler et al. published in Ultramicroscopy 111 (2011) 1405-1416 the possibility of the imaging buried structures has been shown. Such measurements make use of the effect that vibration of the surface of buried structures within the sample will result in sample surface vibration. Vibrations of buried structures can be excited e.g. due to excitation of vibrations of the sample surface, which may reach the buried structure as ultrasound waves.

AFM is an improvement of Atomic Tunnel Microscopy (ATM). In ATM movement of the tip perpendicular to the sample surface is controlled in a feedback loop to maintain a constant electric current through the tip while the relative position of the sample and probe tip is scanned in a direction parallel to the surface of the sample to sense the forces as a function of position on the sample. AFM more generally measures the effect of forces exerted on the probe tip in interaction with atoms of the sample. AFM makes use of a probe tip on a cantilever to sense forces between the probe tip and atoms on the surface of a sample. In particular, properties of (near) resonant cantilever vibration may be measured to sense forces. The forces between the probe tip and the sample can be sensed from their effect on the vibration resonance frequency and/or quality, the phase and/or amplitude relation between the cantilever vibration phase/amplitude and ultrasound phase/amplitude. Different kinds of force interaction between the probe tip and the sample are possible.

As is known per se any mechanical object like a cantilever has a plurality of resonance modes, wherein each resonance mode corresponds to a resonance frequency and a spatial mode pattern of vibration amplitude and phase relations. The cantilever is able to vibrate freely with a sinusoidal time dependence at the resonance frequency and a spatial pattern with vibration amplitudes in proportion to the amplitudes of the mode pattern and phase relations between vibrations at different positions according to the phase relations of the mode pattern. The amplitude and phase of any vibration of the cantilever can be represented as a sum of such mode patterns, each with its own applied amplitude factor and phase. In periodically driven vibrations, the amplitude factors become large for the modes of which the resonance frequency are the same or nearly the same as the excitation frequency. Thus, with excitation frequencies near the resonance frequency of a mode, the cantilever vibration substantially corresponds to the mode pattern. Spatial positions in the mode pattern where the amplitude is zero are called "nodes" and spatial positions of local maxima of the amplitude of the mode patterns are called "bellies".

In "tapping" resonance the probe tip is located at a belly of the resonance mode, so that the tip and the sample exchange intense "tap" force peaks in brief, periodic time intervals without significant interaction outside these time intervals. In contact resonance, the probe tip is located near a node of the resonance mode, so that the tip and the sample exchange relevant forces continuously, not only in brief time intervals and the tip and the sample substantially stay in the same spatial relation. Tapping resonance is useful to measure topographic measurements and contact resonance is more useful to detect sub-surface structure. For both, the cantilever vibration may be measured using reflection of (laser) light from the cantilever, in which case AFM is also called laser force microscopy.

U.S. Pat. No. 5,646,339 discusses an adaptation of the cantilever to make it possible to measure the force exerted on the probe substantially independently in three directions. In order to do so a cantilever is used that has a plurality of excitation modes, which differ from each other in that they have at different resonance frequencies and involve movement in different directions. Thus forces in different directions can be measured by measuring response to excitation of vibrations with different frequencies. In one example, a combination of a transversal vibration mode and a torsional vibration mode is used. The vibrations are sensed by heterodyne mixing of laser reflection from a force measurement point positioned away from the probe tip, that moves in all the modes.

SUMMARY

Among others it is an object to provide for an improved Atomic Force Microscopy (AFM) system and method, which is particularly suitable for mapping buried structures.

An AFM cantilever according to claim 1 is provided. The probe tip of the cantilever is located on an island of the cantilever that is connected to a main body of the cantilever by at least one bridge along a line around which the island is able to rotate through torsion of the at least one bridge. In this way, the probe tip is located so that different types of cantilever vibration modes, involving vibration of the main body and torsion of the island can be excited substantially independently by the interaction between the probe tip and the sample surface. The bridge will transmit vibrations of the main body to the island, so that they affect the orientation of the reflection surface. At the same time rotation of the reflection surface also results in orientation changes of the reflection surface, enabling measurement of both. Such measurements may be performed one at a time or simultaneously, using e.g. the frequency and/or directions of the orientation changes to separate the effects of rotation of the island and vibration of the main body.

An AFM system is provided that comprises such a light source positioned to direct light to the reflection area and a light spot position detector positioned to detect a displacement of a light spot formed from light reflected by the reflection area, for using said displacement to measure an effect of forces exerted on the probe tip by a surface of a sample.

In an embodiment, the AFM system uses a first one of these modes is used at near the resonance frequency in a contact resonance mode and simultaneously a second one of these modes at a low frequency in a feedback loop to control the distance between the cantilever and the sample surface during a scan of the probe tip along the sample surface.

In a embodiment of the cantilever, the island is preferably mass balanced with respect to the line around which the island is able to rotate. That is, the center of mass of the island lies in a plane perpendicular to the top surface of the cantilever that runs through this line and the parts of islands on opposite sides of this plane have equal mass. This reduces coupling between rotation of the island and vibration of the main body. However, an island is with some mass imbalance of e.g. up to 40% and 60% or up to 25% and 60% of the mass of the island on opposite sides may also be used.

The island may be located within an outline of the main body, as viewed from above the top surface of the cantilever that is parallel to the sample surface. In an embodiment of the cantilever, the at least one bridge comprise only a first and second bridge, the first bridge and the second bridge connecting the island to the main body on opposite sides of the island, this island lying within an outline of the main body. This makes it easier to excite rotation of is island around the line on which the bridges are located and reduces coupling between the rotation and vibration of the main body.

In an embodiment, the main body is mass balanced with respect to the line around which the island is able to rotate. That is, the center of mass of the main body lies in a plane perpendicular to the top surface of the cantilever that runs through this line. In this way, coupling between vibration modes of the main body and rotation modes of the islands is minimized.

In an embodiment of the cantilever, the line around which the island is able to rotate extends along a direction of longest size of the cantilever, from the fixed end of the cantilever to its opposite end, e.g., when the surface of the cantilever has a rectangular outline, parallel to the longest edge of the cantilever. As another example, this line may extend perpendicular to the longest direction. When the line extends along the direction of longest size of the cantilever, the rotation of the island and vibrations of the main body result in reflection displacements in different directions, making it possible to separate their effect on this basis.

In an embodiment of the cantilever, the main body of the cantilever has an uneven mass distribution m(x) as function of position x between the ends of the cantilever, an average of a product $m(x)*u^2(x)$ of the mass m(x) and a squared mode shape $u^2(x)$ as a function of position x along the cantilever divided by an average of $u^2(x)$ being larger for a contact vibration mode of order N, with N greater than one, than for a contact vibration mode of order one. In this way the distance between different order resonance modes of the main body can be reduced, which makes it possible to reduce the frequency bandwidth needed to measure effects of forces on a plurality of resonance modes of the main body. This may also be used in cantilevers that do not have an island as claimed in claim 1.

In an embodiment of the cantilever, the main body of the cantilever has an uneven mass distribution m(x) as function of position x between the ends of the cantilever the mass distribution having a maximum at a belly of a contact vibration mode of order N, with N greater than one. This is an effective way of reducing the distance between different order resonance modes of the main body. This may also be used in cantilevers that do not have an island as claimed in claim 1.

In an embodiment of the cantilever the main body comprises a main portion, a neck portion and a head portion, the neck portion lying between the main portion and the head portion, the neck portion having a smaller width than the main portion and the head portion, the cantilever comprising a further reflection area located on the head portion, a difference between a contact resonance frequency of the main body and a resonance frequency of orientation changes of the head portion relative to the main portion due to bending of the neck portion being less that the quality factor of the resonance of said orientation changes of the head portion times the resonance frequency of the resonance of the orientation changes of the head portion. This may also be used in cantilevers that do not have an island as claimed in claim 1: in that case the further reflection area may be the only reflection area that is used. When used in combination with the island, reflection from both the island and the head portion may be measured. The head portion provides for more sensitive measurements of vibration of the main body than the main body itself. Vibration of the head portion will be driven by the main body, and it provides larger orientation vibration amplitude than the orientation vibration amplitude of the main body. The size of the neck portion and/or the mass of the head portion may be adjusted to tune the resonance frequency of the orientation changes of the head portion relative to the main portion.

In an embodiment of the AFM system the AFM system comprises a sample platform; a vibration generator coupled to the platform and/or the cantilever for generating vibration in the sample and/or the cantilever, a first end of the cantilever being fixed in said vibration; an actuator for moving the cantilever and the platform relative to each other, at least in a height direction perpendicular to the surface of the sample and a scan direction parallel to the surface of the sample; and a control circuit. The control circuit may be configured, e.g. by means of a control program of a programmable in the control circuit, to control the actuator to move the cantilever and the platform relative to each other progressively in the scan direction; activate the vibration generator to generate vibrations of the sample relative to the cantilever at a frequency of a contact resonance mode of the cantilever; measure properties of vibration of the cantilever in the contact resonance mode from a first component of the displacement during movement of the cantilever and the platform relative to each other in the scan direction, control the actuator to move the cantilever and the platform relative to each other in the height direction in a feedback loop in response to a second component of the displacement during movement in the scan direction. Thus contact resonance can be measured continuously during the scan or at least most of the time during the scan.

In a further embodiment of the AFM system the light spot position detector is configured to distinguish light spot displacements in first and second, different two dimensional directions, the control circuit being configured to derive the first second component of the displacement from the light spot displacements in the first and second two dimensional directions. In this way the measurements of torsion of the island and vibration of the main body that are transmitted to the island can be at least partially separated based on the direction of the displacement.

In an embodiment of the AFM system the feedback loop comprises a low pass frequency filter to filter the second component of the displacement from an output of light spot position detector. This provides for alternative or further of torsion of the island and vibration of the main body that are transmitted to the island.

In use the cantilever may be used by generating vibration of a sample relative to the cantilever at a frequency of a contact resonance mode of the cantilever;

moving the cantilever and the platform relative to each other, at least in a height direction perpendicular to the surface of the sample and a scan direction parallel to the surface of the sample;

directing light at the reflection area and measuring displacement of a light spot due to light reflected by the reflection area;

measuring properties of vibration of the cantilever in the contact resonance mode from a first component of the displacement during movement of the cantilever and the platform relative to each other in the scan direction controlling movement of the cantilever and the platform relative to each other in the height direction in a feedback loop in response to a second component of the displacement during movement in the scan direction.

BRIEF DESCRIPTION OF THE DRAWINGS

These and other objects and advantageous effects will become apparent of exemplary embodiments with reference to the following figures.

FIG. 2, 2a-c show an AFM cantilevers for contact resonance mode measurement

FIG. 4, 4a show an AFM cantilevers for contact resonance mode measurement

FIG. 4b shows mode patterns

FIG. 5 shows an AFM cantilevers for contact resonance mode measurement

DETAILED DESCRIPTION OF EXEMPLARY EMBODIMENTS

Figure 1:
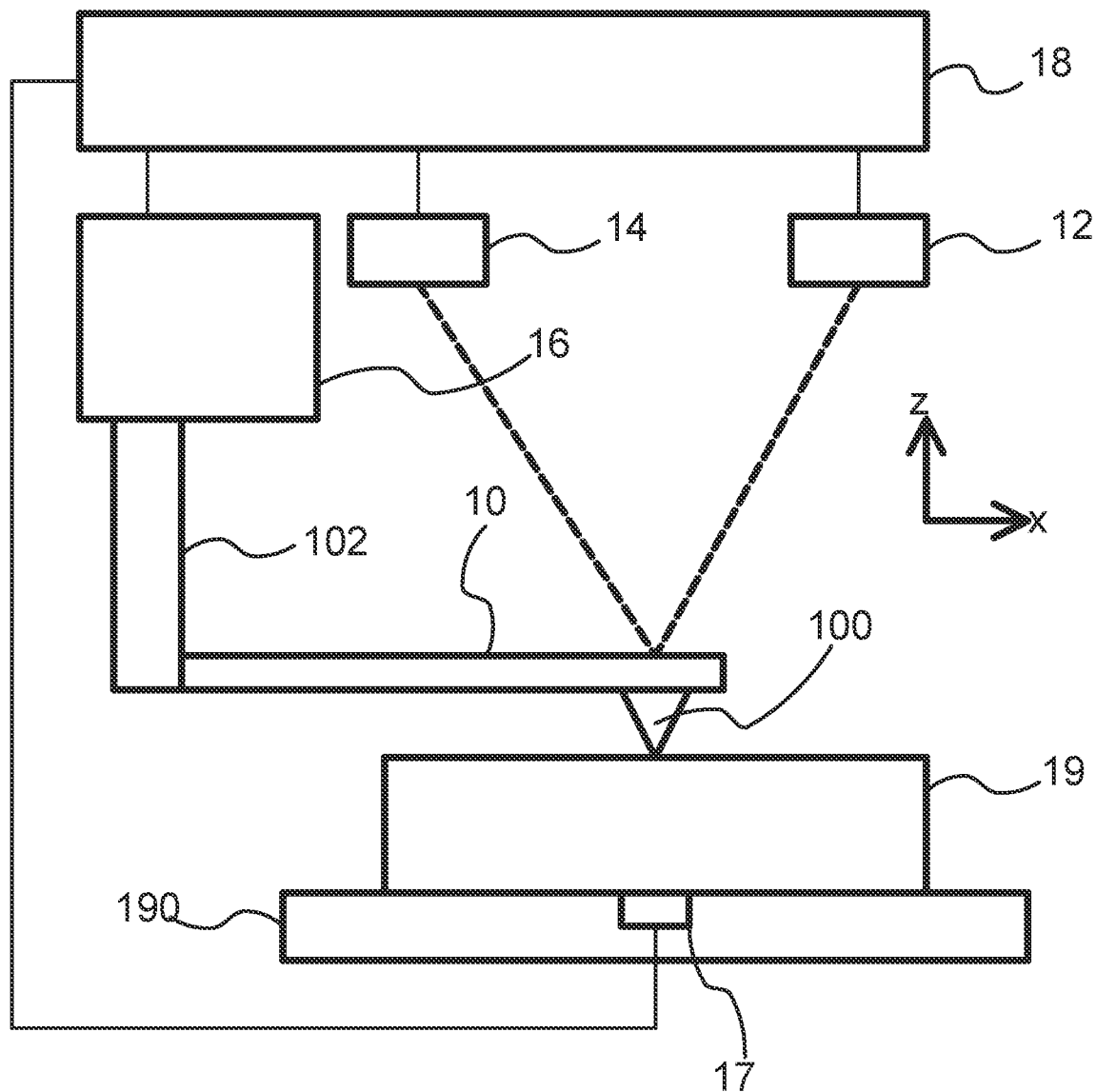
FIG. 1 shows an AFM system

FIG. 1 shows an AFM system (components not to scale) comprising a cantilever 10, a light source 12, a light position detector 14, an actuator 16, an ultrasound transducer 17 and a control circuit 18. Cantilever has a fixed end connected to a cantilever support 102. A probe tip 100 is located on cantilever 10 at a distance from the fixed end. A sample 19, which does not form part of the AFM system per se, is shown to illustrate the operation of the AFM system. In the illustrated embodiment, sample 19 is located between ultrasound transducer 17 and cantilever 10, on a sample platform 190 of the AFM system. A surface of sample 19 faces cantilever 10. Probe tip 100 is directed from cantilever 10 towards the surface of sample 19.

Actuator 16 is configured to move sample 19 and cantilever 10 relative to each other in directions transverse and parallel to the surface of sample 19, so that probe tip 100 may be moved parallel and transverse to the surface of sample 19 due to the effect of actuator 16. For the sake of illustration an x and z direction are indicated that are parallel and perpendicular to the surface of sample 19. By way of example, an actuator 16 for translating cantilever 10 in three directions relative to a base of the AFM system is shown, with sample 19 fixed on the base. But alternatively an actuator may be used that is configured to move a sample platform for sample 19 or both the sample platform and cantilever 10 relative to the base to realized movement in one or more of the directions. Actuator 16 may comprise a plurality of bodies of piezoelectric material coupled between the base of the AFM system and cantilever 10 and/or the sample platform. Control circuit 18 may be configured to apply voltages to these bodies of piezoelectric material to cause motion. Alternatively, another type of actuator may be used, such as a magnetic field driven actuator or an actuator that is driven by electric forces without piezo material.

Ultrasound transducer 17 may similarly comprise one or more bodies of piezo electric material. Alternatively, other forms of excitation may be used, such as photothermic excitation. In the illustrated example ultrasound transducer 17 is used to excite vibrations that travel to the probe tip through the sample, but alternatively a transducer at a different location may be used to excite at the same surface as where the probe tip is located, for example via the probe tip or elsewhere on the surface.

Light source 12, which is preferably a laser light source, is directed to transmit a light beam to a reflection area on cantilever 10 and light position detector 14 is placed to receive the light beam after reflection from the reflection area. The entire upper surface of cantilever 10 may be reflective, or a part of the upper surface that is equal to or larger than the reflection area may be reflective. The reflection area is a part of this surface that receives light from light source 12. A coating layer or area of e.g. aluminum or gold may be provided at the upper surface of cantilever 10 to provide for improved reflection. The reflected light forms a light spot on light position detector 14. Light position detector 14 may comprise four photodiodes, located in respective quadrants. Alternatively another light spot position detector may be used, such as an image sensor, or a pair of adjacent photodiodes. Control circuit 18 has an input coupled to an output of light position detector 14 and outputs coupled to control inputs of actuator 16.

Figure 2:
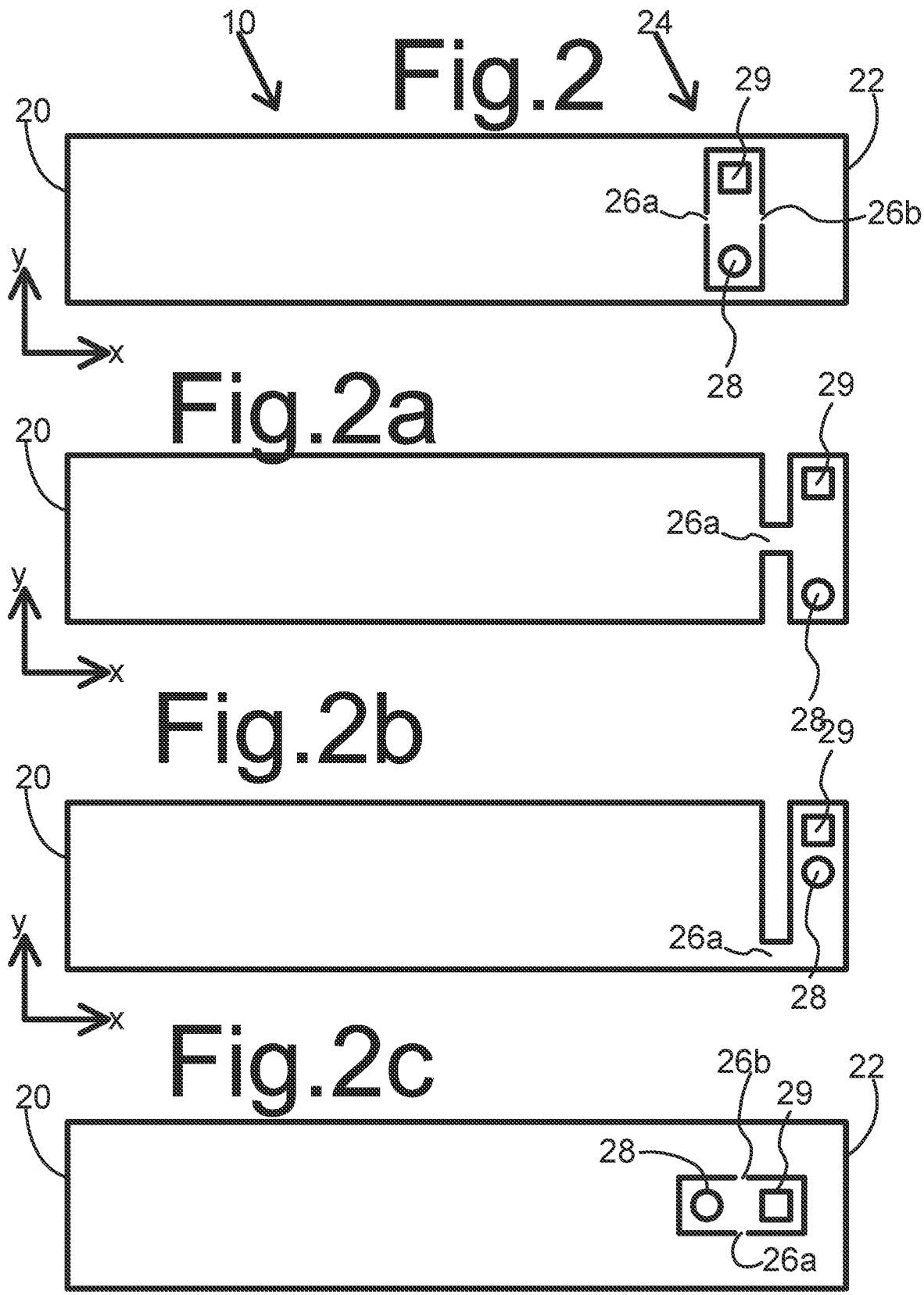

FIG. 2 shows an exemplary cantilever geometry that allows for vibration in different directions by the main body of the cantilever and of an island 24 respectively. This embodiment may be called a cantilever-in-cantilever geometry. In this geometry, cantilever 10 has a rectangular outline, with a fixed end 20 and a free end 22 on opposite sides of the rectangular outline. Preferably fixed end 20 and a free end 22 are the shortest edges of the rectangular outline. In FIG. 2, x and y directions are indicated along the direction between fixed end 20 and free end 22 and perpendicular to that direction respectively. Fixed end 20 is connected to the base of the AFM system, e.g. via the actuator (not shown). Free end 22 is permanently connected to the base only through cantilever 10 and fixed end 20.

Within the rectangular outline, cantilever 10 comprises an island 24, in the form of an interior rectangle, that is connected to a main body of cantilever 10 only at two connecting bridges 26a,b on two opposite edges of interior rectangle 24 along a separation between the island and the main body, midway along these opposite edges. As used herein, an island is a part of the cantilever that, seen in top view, is connected to the main body of the cantilever only via one or more connecting bridges that interrupt the separation between the island and the main body of the cantilever. In the illustrated embodiment, connecting bridges 26a,b extend only over part of the opposite edges, e.g. over less than one fifth or one tenth of the opposite edges. The remainder of the circumference of interior rectangle 24 is separate from the main body of cantilever 10. Connecting bridges 26a,b may be an integral part of the body of cantilever 10. The cantilever may be formed from a body of material and cutting (e.g. laser cutting) or etching through the body along the circumference of interior rectangle 24, except at bridges 26a,b.

As illustrated, connecting bridges 26a,b are preferably located on the central line (in the x-direction) midway the longest edges of the rectangular outline of cantilever 10. The longest direction of interior rectangle 24 may be perpendicular to this central line, i.e. along the y-direction. Island 24 may be located near free end 22, or more generally not closer to fixed end 20 than to free end 22. A probe tip at a probe tip position 28 and a reflection area 29 are provided on island 24 on the surfaces of island 24 that face the sample and face away from the sample respectively. As noted the upper surface of the island may be intrinsically reflective or a reflective surface layer may be added. The reflection area should be large enough to provide for orientation dependent reflection of light from the light source, e.g. with a direction dependent intensity that peaks in a peak direction dependent on the orientation of the reflection surface. The center of the probe tip position 28 is offset in the xy plane from the line connecting bridges 26a,b (offset in the y-direction). In the illustrated embodiment, probe tip position 28 and the position of reflection area 29 are offset in the xy plane on opposite sides of the line connecting bridges 26a,b. Alternatively, reflection area 29 may be located on this line, or the probe tip position 28 and the position of reflection area 29 may be offset in the xy plane on the same side of that line.

The cantilever geometry with an interior rectangle connected by bridges supports different vibration modes, which substantially correspond to bending of the cantilever as a whole, and rotation of island 24 around the line connecting bridges 26a,b due to torsion of connecting bridges 26a,b respectively. In the mode that substantially corresponds to bending of the cantilever as a whole there is little or no rotation of island 24 and vice versa the same applies to the mode that substantially corresponds to rotation of island 24. Therefore, the resonance frequencies of these modes can be adapted substantially independently, so that both are within measurement range.

Preferably, the mass (volume) of the island 24 is much smaller than that of the main body of the cantilever (e.g. less than one fourth or one tenth), so that the main body has a substantial mass involved in vibration of the cantilever. To ensure that the resonance frequencies are far apart, bridges 26a, b that are narrower than the cantilever, so that the stiffness that acts against independent vibration of island 24 is small. Simultaneous movement in more than one mode is provided for, by asymmetry of the position of the position 28 probe tip with respect to the central symmetry line (in the x-direction) of the main body of the cantilever. In operation, control circuit 18 controls actuator 16 to scan (preferably translate) the relative position of sample 19 and cantilever 10 in one or two directions (x and/or y direction) parallel to the surface of sample 19. During the scan, light source 12 directs a light beam at reflection area 29 on cantilever 10. Reflection area 29 reflects the light beam to light position detector 14, where it forms a light spot at a position that depends on an orientation of reflection area 29.

In the illustrated embodiment, the two described modes result in orientation changes of reflection area 29 around two axes, which in turn result in light spot position changes in two directions at light spot detector 14. Spot detector 14 detects these position changes. For example, when a four quadrant light detector 14 is used, relative changes of the resulting light intensities detected by four quadrant light detector 14 are indicative of changes of the position of the light spot and hence the orientation of reflection area 29.

Changes of the orientation of reflection area 29 can be the result of bending of the main body of cantilever 10 (rotation of reflection area 29 around the y-direction as a result of bending of cantilever 10 in the x-z plane,) and of rotation of island 24 relative to main body of cantilever 10 (rotation of reflection area 29 around the x-axis in a result of rotation the y-z plane,). Control circuit 18 is configured to derive signals representing these two rotations, from the light intensities that are detected by four quadrant light detector 14.

In the illustrated embodiment control circuit 18 controls ultrasound transducer 17 to excite ultrasound waves at the bottom of sample 19. The ultrasound waves travel through sample 19. At probe tip 100, vibrations of cantilever 10 are excited due to effects of the ultrasound waves on the sample. In one embodiment ultrasound transducer 17 is used to excite ultrasound waves at a plurality of frequencies in the sample. Non-linear mixing effects, e.g. between the sample and the probe tip, are used to produce surface vibrations at a difference frequency. These surface vibrations result in vibrations of cantilever 10. In turn, the vibrations of cantilever (e.g. bending in the x-z plane) causes periodic rotation of reflecting area 29, which causes periodic deflection of light from light source 12 and periodic changes of the output signals from light position detector 14.

During the scan, ultrasound transducer 17 is used to generate vibrations at a frequency or frequencies that result in vibrations of cantilever 10 at or near a contact mode resonance frequency of cantilever 10.

As is known per se, contact resonance corresponds to a resonance mode of cantilever 10 that has a node near the position of probe tip 100. In the contact mode resonance, the surface orientation of cantilever 10 at the node varies periodically. The resonance frequencies of such cantilever modes may be computed analytically or numerically using the Euler-Bernoulli equations of cantilever vibration. Alternatively, one or more of such frequencies may be determined experimentally.

In a contact resonance mode, probe tip 100 and sample 19 exchange relevant forces continuously. These forces are affected by elastic and inelastic responses of the sample, including responses due sub-surface structures near the surface. These responses in turn affect resonance properties, such as the resonance frequency and/or quality. This makes contact mode resonance suitable for detecting and analyzing such sub-surface structures.

Control circuit 18 derives measurements of properties of the contact resonance from these periodic changes. This is known per se. For example, control circuit 18 may determine the amplitude and/or phase of the periodic changes, and/or the resonance frequency and/or quality. The latter two may be determined for example by sweeping the excitation frequency and measuring amplitude and/or phase of periodic changes during the sweep.

Control circuit 18 is configured to determine the resonance properties using a first component of light spot position changes, which corresponds to movements that are part of the contact resonance. For example, when the mode that substantially corresponds to bending of the cantilever as a whole is excited at or near the contact resonance frequency, rotation of reflecting area 29 around the y-axis may be measured for this purpose, by measuring in light spot movement in the x direction (the longest direction of cantilever 10).

Control circuit 18 is configured to control the height of cantilever above the surface of sample 19 in a feedback loop during the scan, to keep the rotation of reflecting area 29 around the other axis on average constant during the scan.

Changes of this rotation are due scanning motion rather than contact resonance excitation. In the example wherein the mode that substantially corresponds to bending of the cantilever as a whole is excited at or near the contact resonance frequency, the rotation of island 24 around the x-axis relative to main body of cantilever 10 may be kept on average constant during the scan. For this purpose, control circuit 18 is preferably also configured to apply low pass filtering to the signal that represents the rotation component of reflecting area 29 that is perpendicular to rotation due to the contact resonance, and to use the low pass filtered signal to control the input signal of actuator 16 that controls the height of cantilever 10. The low pass filter bandwidth is selected to ensure suppression of frequency components at frequencies corresponding to contact mode resonance frequencies.

Preferably, control circuit 18 is configured to measure the rotation in response to contact resonance mode excitation simultaneously with controlling the height of cantilever above the surface of sample 19 in the feedback loop, or alternately using measurements of rotation response and for control so that the control of the height remains effective during measurement of the rotation in response to this excitation. In theory, the feedback control can be interrupted briefly during time intervals that are so short that the height cannot vary significantly in these intervals, but preferably it is continuous during the contact mode resonance measurements.

Although a specific cantilever geometry with an island in the form of an interior rectangle connected by bridges has been shown, it should be appreciated that other geometries could be used. For example, the island may have another shape in the interior of the cantilever, such as an ellipse, or a polygon such as a regular hexagon or a bow-tie and/or one of connecting bridges 26a,b may be omitted.

FIG. 2a-c show other examples of other layouts. In FIG. 2a,b the position 28 probe tip and the position of the reflection area 29 are on a first part of the cantilever that is connected to the remainder of the cantilever via a single bridge 26a, and this first part is exterior to the remaining part, rather than surrounded by the remaining part. In FIG. 2c, an internal island is shown that rotates around a line in the y direction, by torsion of bridges 26a,b that extend in the y direction on opposite sides of the symmetry line of the main body 20. Instead of rectangles other shapes may be used for the first part or the bridge. It should be noted that FIGS. 2, 2a-c do not show limitative examples. Other layouts may be used.

Preferably, the probe tip is located offset from an axis of rotation of the island around the bridge or bridges. This facilitates excitation of rotation of this axis by the probe tip. More preferably, the surface shape of the island is mirror symmetric about a symmetry line on which the bridge or bridges are located, or at least that the mass of the island is balanced with respect to the axis of rotation, i.e. that the center of mass of the island lies substantially on the axis of rotation. This reduces coupling between the rotation of the island and vibration of the main body of the cantilever. Preferably, the mass of main body is balanced with respect to the axis of rotation of the island, e.g. the bridge or bridges may lie on a line about which the main body of the cantilever is mirror symmetric. This reduces coupling between the rotation of the island and vibration of the main body of the cantilever.

The reflection area is preferably located on the island, so that the orientation of the reflection area will vary both with vibration of the island and vibration of the main body of the cantilever. The reflection area may be located over the rotation axis of the island. When the surface of the main body of the cantilever is mirror symmetric and the bridge or bridges are located on the mirror symmetry line of the surface of the main body, the orientation changes due to rotational vibrations of the island and vibration of the main body modes are substantially perpendicular, so that both can be measured substantially independently of each other, from perpendicular motion components of light spot movement.

However, although substantially perpendicular motions make measurements easier, they are not indispensable. Low pass filtering may be used to suppress the effect of contact resonance movement on the feed back loop and/or the direction of the light spot movement component used for the feedback may be set along a direction along which the contact resonance movement has no effect. In other embodiments a plurality of reflections areas may be used to measure different displacement components. A first reflections area may be located on the island and a second reflections area may be located elsewhere. Displacements of separate light spots may be measured.

The cantilever geometries of FIGS. 2, 2a, 2b and similar geometries make it possible to optimize individual parts of the geometry largely independently for feed back and contact resonance. Preferably the part of the geometry whose motion is used for the feed back is made less stiff than the part used for the contact resonance. For example, when the rectangle in rectangle geometry is used, the optical effect of rotation of the island around the axis through bridges 26a,b may be used for the feed back. In this case, narrow bridges 26a,b could be used to reduce stiffness of this rotation and the remainder of the cantilever can be made to have a higher stiffness for use in contact resonance measurements to measure sub-surface structures. Similar optimizations may be used in similar embodiments such as the embodiments of FIGS. 2a, b. The cantilever geometries of FIGS. 2, 2a, 2b and similar geometries also make it possible to maximize the separation between the motion direction due to feedback and resonance.

Figure 3:
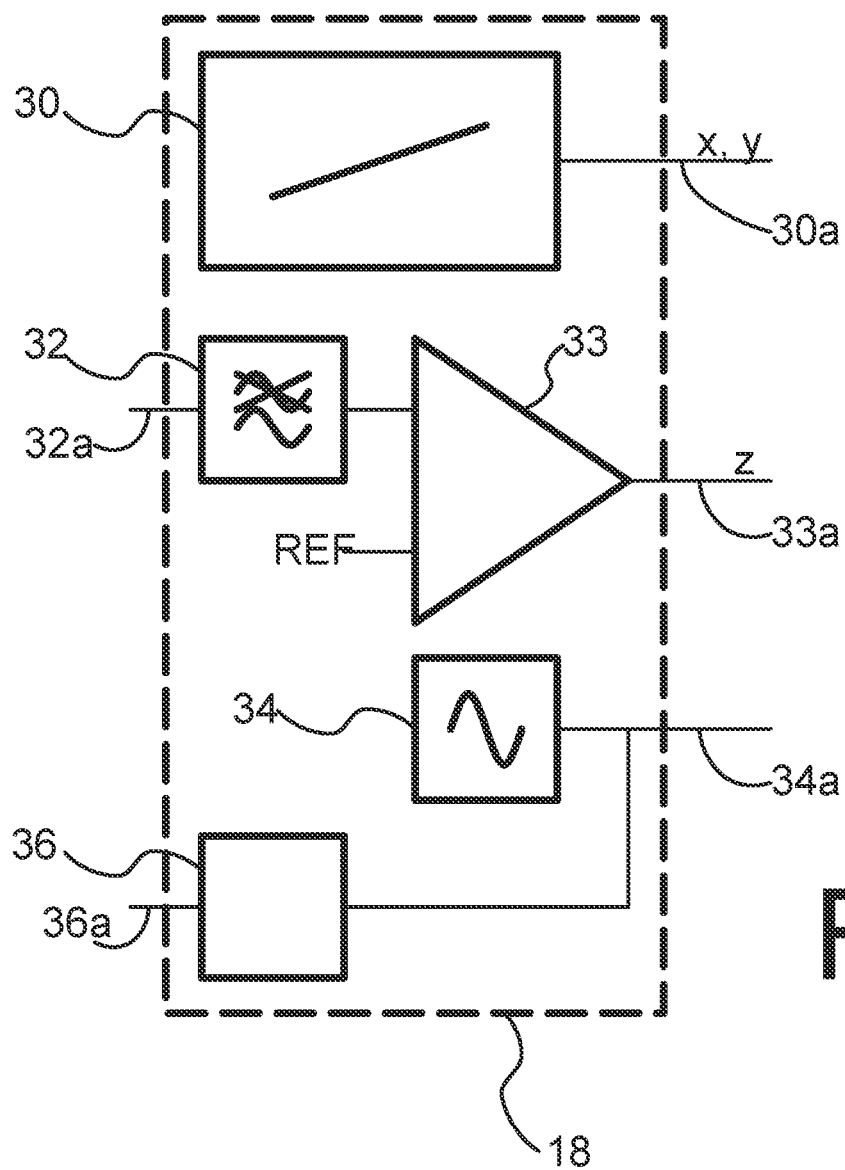
FIG. 3 shows a control circuit

FIG. 3 shows an exemplary embodiment of control circuit 18, comprising a scan signal generator 30, a filter 32, a differential amplifier 33, an oscillator 34 and a detector 36. Scan signal generator 30 may comprise an oscillator with an x and/or y control output coupled to an output or outputs 30a of control circuit for connection to x and/or y movement control inputs of the actuator.

An input of filter 32 is coupled to an input 32a of control circuit for connection to a first output of the light spot position detector, for a signal indicating spot displacement in a first direction by the light spot position detector. Differential amplifier 33 has first and second inputs coupled to an output of filter 32 and a reference input. Differential amplifier 33 has a z control output coupled to outputs 33a of control circuit for connection to a z movement control input of the actuator.

Oscillator 34 is configured to oscillate at a frequency at or near a resonance frequency of a contact vibration mode of the cantilever. Oscillator 34 has an output coupled to an output 34a of control circuit for connection to the ultrasound transducer. An input of detector 36 is coupled to an input 32a of control circuit for connection to a second output of the light spot position detector, for a signal indicating spot displacement in a second direction by the light spot position detector. Detector 36 may be a synchronous detector, with an input for a reference signal or signals from oscillator 34 at the frequency at or near a resonance frequency of a contact vibration mode of the cantilever. In other embodiments, oscillator 34 may be replaced by a pair of oscillators configured to oscillate at frequencies spaced by that frequency.

Although FIG. 3 shows the embodiment in terms of components that may be realized as distinct circuits, control circuit 18 may comprise a programmable computer and a memory wherein a computer program is stored to configure the computer to implement part or all of the different components of the embodiment of FIG. 3 digitally. In addition to the illustrated components, the computer program may provide for pre-processing of the signals from the light spot position detector and post-processing to the detected vibration properties and for storing measurements in correspondence with different scan positions of the generated x and/or y scan. Alternatively, or in addition control circuit 18 may comprise hardware components to implement part of all of the components.

Contact mode resonance for detecting and/or analyzing effects of sub-surface structures usually provide only for measurements in a limited stiffness variation range, because the resonance frequency has an S-shape dependence on stiffness. To provide for more ranges, or a larger range, with a single cantilever it is desirable to be able to measure contact resonance changes of a plurality of contact resonance modes. However, it is undesirable to do so in a way that increases stiffness too much, as this increases the risk of damage to the substrate surface. FIG. 4 illustrates a cantilever 40 design for increasing the number of contact resonance modes that can be used for the measurements.

FIG. 4 shows a side view of another embodiment of a cantilever 40 with a probe tip 400. Herein the thickness of cantilever 40 varies unevenly as a function op position from the fixed end 42 to the location of probe tip 400 (along the x-direction). The variation of thickness is shown as an embodiment of an uneven distribution of mass of cantilever 40 as a function op position from the fixed end 42 to the location of probe tip 400. Other embodiments of uneven mass distribution include variation of the width of cantilever 40 (in the y direction, cf. FIG. 4*a*) and a combination of variation of width and thickness. A maximum 44, or maxima, of the mass distribution is or are located at the position of a belly or bellies of a contact resonance mode of order N>1 that has node at probe tip 400 and a further node between probe tip 400 and fixed end 42. As shown, in FIG. 4, a single rise in the height of the top surface in a belly may be used. Alternatively rises at a plurality of bellies may be used, and/or lowered bottom surface. Similarly, the width of cantilever 40 may be increased in multiple bellies on both sides of cantilever 40 as shown in FIG. 4*a*, or in a single belly and/or or one side. Embodiments like FIG. 4, 4*a* and their variations may be used in combination with embodiments like those of FIGS. 2, 2*a*, 2*b*, or on their own.

FIG. 4*b* illustrates mode patterns of orders N=1 and N=2 as a function of x-positions with on the cantilever: the z displacement at different x-positions is the product $u(x)*f(t)$ of a mode amplitude $u(x)$ the mode pattern with a periodic time dependent function $f(t)$. The x-scale is in FIG. 4*b* the same as in FIG. 4. As is known per se, nodes 48 of a vibration mode are positions along cantilever 40 at which the z-position does not change as a result of vibration according to the vibration mode, i.e. where $u(x)=0$ and bellies 46 are positions where the amplitude $|u(x)|$ of the z-position change is maximal. The number N of bellies 46 will be referred to as the order N of the vibration mode.

The resonance frequency of the modes generally increases with increasing order N. In practice, vibration in vibration modes with resonance frequencies above that of a critical order Nc are not detectable in an AFM. Often Nc=1 for contact resonances, so that only the lowest order vibration contact resonance is detectable. A typical maximum detectable resonance frequency in AFM is 5 MHz.

Per se, addition of mass to a cantilever has the effect that it reduces the resonance frequencies of its vibration modes. This makes it possible to raise the critical order, e.g. to Nc=2. However, the addition of mass also increases the stiffness of cantilever 40, which increases the risk of damage to the substrate or cantilever 40, and counteracts the effect on the resonance frequency. The uneven mass distribution as a function of x position with a maximum at a belly 46 of the contact vibration mode of order N=2 makes it possible to improve the ratio between the reduction of the resonance frequency and the increase of the stiffness for the mode of order N=2. Thus, for example, the uneven distribution makes it possible to accomplish the same reduction in resonance frequency for the contact resonance more of order N=2 with less increase in stiffness and hence less risk of damage. In this way contact resonance modes of more others can be made detectable, e.g. up to N=2, or even up to N=3 or N=4. With more resonance modes effects deeper below the sample surface become detectable.

It should be appreciated that this ratio of the effect on frequency and stiffness is maximal when the maximum or maxima of the mass distribution are concentrated at the belly or bellies. But such an optimum is not necessary to obtain at least some effect. An effective unevenness suffices. Similarly, for a given mass spread, it is optimal but not necessary locate the maximum or maxima of the mass distribution at the position of the belly or bellies.

The effective unevenness can be quantified in terms of a correlation coefficient C between the square of the mode amplitude factor for a cantilever with evenly distributed mass and the actual uneven mass. Such a correlation coefficient corresponds to $<m(x)*u^2(x)>/<u^2(x)>$, i.e. the average, taken over positions x along the length of the cantilever of the product $m(x)*u^2(x)$ of the mass $m(x)$ and the squared mode shape factor $u^2(x)$ as a function of position x along the cantilever, divided by the average of $u^2(x)$. The average kinetic energy of mode motion is proportional to this correlation coefficient. When the unevenness increases the ratio $C(N_h)/C(N_l)$ of the correlation coefficients of modes $N_h$ and $N_l$ (e.g. $N_h=2$ and $N_l=1$) the ratio $f(N_h)/f(N_l)$ of their resonance frequencies decreases. Preferably, a mass distribution is used that at least increase the ratio $C(N_h=2)/C(N_l=1)$ for the second and first mode. This can be realized by increasing the mass around the bellies of the higher order mode Nh, e.g. by using a mass distribution that has a maximum at the belly of the higher order mode $N_h$, preferably for $N_h=2$ The embodiment with the uneven mass increase of FIG. 4 may be combined with the embodiment of FIG. 2 and its use to regulate the height during the scan while contact mode resonance properties are measured. Alternatively, the embodiment with the uneven mass increase may be used separately from the embodiment of FIG. 2. The advantage of using a combination of the embodiments of FIGS. 2 and 4 is that more modes can be measured in parallel with use of the feedback loop.

FIG. 5 shows a top view (in the xy plane) of another embodiment of a cantilever 50 wherein the probe tip and the reflecting surface lie in different parts of the cantilever that have different motion properties. Cantilever 50 has a main portion 52, a neck portion 54 and head portion 56. In this embodiment neck portion 54 lies between head portion 56 and main portion 52. A plurality of neck portion 54 may be used in parallel between head portion 56 and main portion 52. A cantilever 50 with a main portion 52 and a neck portion 54 would have two underlying types of vibration: vibration of main portion 52 and vibration of head portion 56, if the resonance frequencies of these vibrations would not be close to each other.

The position of probe tip 500 lies in main portion 52, between neck portion 54 and the fixed end 51 of cantilever 50. In neck portion 54 the width of cantilever 50 is smaller than in head portion 56 and main portion 52 that contains fixed end 53 and probe tip 500. A reflection area 58 is provided on head portion 56.

The purpose of the smaller width in neck portion 54 is to make the orientation changes of reflection area 58 as a result of vibration of main portion 52 in contact resonance modes larger than the orientation changes elsewhere on cantilever 50. This improves detectability of vibration.

Instead of the bridge-connected island formed by head portion 56 other geometries may be used such as an island connected by more than one bridge, an island within the main portion of the cantilever and/or an island along the side of the cantilever.

The orientation changes of the head portion due to bending of neck portion 54 are mechanically similar to vibration of the mass of head portion 56 under influence of a spring force provided by neck portion 54, with a resonance frequency that is proportional to the square root of the stiffness of neck portion 54 divided by the mass of head portion 56. The width, thickness and/or the length of neck portion 54 may be adjusted to change the stiffness of neck portion 54 in order to tune the resonance frequency. Similarly, the mass of head portion 56 may be changed to tune the resonance, keeping the mass much smaller than that of main portion 52 (e.g. less than 10% of the mass of main portion 52).

Preferably a difference between a contact resonance frequency of main portion 52 and a resonance frequency of orientation changes of head portion 56 relative to main portion 52 due to bending of neck portion 54 is less that the quality factor of the resonance of said orientation changes of head portion 56 times the resonance frequency of the resonance of the orientation changes of head portion 56 and preferably less than half that product. As is known per se the quality factor characterizes a resonator's bandwidth relative to its center frequency. The resonance frequencies can be adjusted to be close to one another by adjusting the mass and/or stiffness of head portion 56 and/or neck portion 54 relative to those of main portion 52. Adding mass and reducing stiffness reduces the resonance frequency and vice versa. Suitable values may be determined experimentally or by simulation.

As a result head portion 56 provides for more sensitive measurements of vibration of main portion 52 than main portion 52 itself. Vibration of head portion 56 will be driven by the main portion 52, and it provides larger orientation vibration amplitude of head portion 56 than the orientation vibration amplitude of main portion 52.

In contrast to the embodiments of FIG. 2, 2a, 2b, the head portion 56 and main portion 52 and neck portion 54 are configured so that resonance frequencies of resonance of the two underlying types of vibration are selected to lie so close to one another that this result in a mode pattern that strongly couples the vibration mode patterns of underlying types of vibration of the head portion and the main portion that would occur in the case of disparate resonances frequencies of the head portion and the main portion.

The embodiment with the neck portion of FIG. 5 may be combined with the embodiment of FIGS. 2 and/or 3 and their use to regulate the height and/or reduce the resonance frequency of the higher order mode(s). In an embodiment the cantilever may have a first and second reflecting surface, lying on a first and second island part of the cantilever respectively, that are each connected to the remainder of cantilever by one or more bridges. The probe tip may lie on the first island, which may be configured as in FIG. 2 for example, and the second island may be configured as shown in FIG. 5. In another or further embodiment, a further island with the reflections surface may be connected to the island with the probe tip. In an embodiment the cantilever may have an uneven mass distribution as in the embodiment of FIG. 4 and an island with a reflecting surface like head portion 56. Alternatively, the embodiment with the neck portion of FIG. 5 may be used separately from the embodiment of FIGS. 2 and/or 4. The advantage of using a combination of the embodiments of FIGS. 5 and 2 or 4 is that larger amplitude changes in light spot position are made possible in combination with at least one of the modes.

What is claimed is:

1. An atomic force microscopy (AFM) system comprising:
   a sample platform; and
   a cantilever comprising:
      a main body, the main body forming a part of a surface of the cantilever, wherein a first end of the main body is coupled, either directly or indirectly, to the sample platform;
      an island, the island forming a further part of the surface of the cantilever, the island being partly separated from the main body by a separating space between facing edges of the main body and the island;
      at least one bridge connecting the island to the main body along a line around which the island is able to rotate through torsion of the at least one bridge, wherein the line extends along a direction of a longest size of the cantilever;
      a reflection area located on the island; and
      a probe tip located on the island at a position offset from the line around which the island is able to rotate;
   a light source positioned to direct a light to the reflection area;
   a light spot position detector positioned to detect a displacement of a light spot formed from light reflected by the reflection area;
   a vibration generator coupled to the platform for generating vibrations in the sample that travel to the probe tip through the sample; and
   a control circuit configured to activate the vibration generator to generate vibrations of the sample relative to the cantilever at a frequency of a contact resonance mode of the cantilever, the contact resonance mode being due to bending of the main body by an anti-node of contact resonance between the first end and the island.

2. The AFM system according to claim 1, further comprising:
   an actuator for moving the cantilever and the platform relative to each other, at least in a height direction perpendicular to the surface of the sample and a scan direction parallel to the surface of the sample;
   a control circuit configured to:
      control the actuator to move the cantilever and the platform relative to each other progressively in the scan direction;

measure properties of vibration of the cantilever in the contact resonance mode from a first component of the displacement during movement of the cantilever and the platform relative to each other in the scan direction; and control the actuator to move the cantilever and the platform relative to each other in the height direction in a feedback loop in response to a second component of the displacement during movement in the scan direction.

3. The AFM system according to claim 2, wherein the light spot position detector is configured to distinguish light spot displacements in a first dimensional direction and a second dimensional direction that differs from the first dimensional direction, wherein the control circuit is configured to derive the first component of the displacement and the second component of the displacement from the light spot displacements in the first dimensional direction and the second dimensional direction, respectively.

4. The AFM system according to claim 2, wherein the feedback loop comprises a low pass frequency filter to filter the second component of the displacement from an output of light spot position detector.

5. The AFM system according to claim 2, wherein the main body comprises: a main portion, a neck portion and a head portion, wherein the neck portion lies between the main portion and the head portion, wherein the neck portion has a smaller width than the main portion and the head portion, wherein the cantilever comprises a further reflection area located on the head portion, wherein a difference between a contact resonance frequency of the main body and a resonance frequency of orientation changes of the head portion relative to the main portion due to bending of the neck portion being less than the quality factor of the resonance of said orientation changes of the head portion times the resonance frequency of the resonance of the orientation changes of the head portion.

6. The AFM system according to claim 1, wherein the main body is mass balanced with respect to the line.

7. The AFM system according to claim 1, wherein the at least one bridge consists of a first bridge and a second bridge, the first bridge and the second bridge connecting the island to the main body on opposite sides of the island, wherein the island lies within an outline of the main body.

8. The AFM system according to claim 7, wherein the main body is mass balanced with respect to the line.

9. The cantilever according to claim 1, wherein the main body comprises: a main portion, a neck portion and a head portion, wherein the neck portion lies between the main portion and the head portion, wherein the neck portion has a smaller width than the main portion and the head portion, wherein the cantilever comprises a further reflection area located on the head portion, wherein a difference between a contact resonance frequency of the main body and a resonance frequency of orientation changes of the head portion relative to the main portion due to bending of the neck portion being less than the quality factor of the resonance of said orientation changes of the head portion times the resonance frequency of the resonance of the orientation changes of the head portion.

10. The AFM system of claim 1, wherein the displacement has a first component in a first direction due to said bending, and wherein the control circuit is configured to use the first component of the displacement of the light spot to measure an effect of a force exerted on the probe tip by a surface of a sample on the sample platform.

11. The AFM system of claim 10, wherein the displacement has a second component in a second direction corresponding to rotation of the island around said line, wherein a position of a center of the probe tip is offset from said line, and wherein the control circuit is configured to:

control the actuator to move the cantilever and the platform relative to each other in a height direction perpendicular to the surface of the cantilever in a feedback loop in response to said second component of the displacement of the light spot.

12. The AFM system of claim 1, wherein the probe tip is located substantially at a node of the contact resonance mode.

13. The AFM system of claim 1, wherein a mass of the island is less than one fourth that of the main body of the cantilever.

14. The AFM system of claim 1, wherein a mass of the island is less than one tenth that of the main body of the cantilever.

15. A method of performing atomic force spectroscopy with an atomic force microscopy (AFM) system, wherein the AFM system comprises:

a sample platform;

a cantilever comprising:

a main body, the main body forming a part of a surface of the cantilever, a first end of the main body being directly or indirectly coupled to the sample platform;

an island, the island forming a further part of the surface of the cantilever, the island being partly separated from the main body by a separating space between facing edges of the main body and the island;

at least one bridge connecting the island to the main body along a line around which the island is able to rotate through torsion of the at least one bridge, wherein the line extends along a direction of a longest size of the cantilever;

a reflection area located on the island; and a probe tip located on the island at a position offset from the line around which the island is able to rotate;

a light source positioned to direct a light to the reflection area;

a light spot position detector positioned to detect a displacement of a light spot formed from light reflected by the reflection area; and a vibration generator coupled to the platform for generating vibrations in the sample that travel to the probe tip through the sample; and wherein the method comprises activating the vibration generator to generate vibrations of the sample relative to the cantilever at a frequency of a contact resonance mode of the cantilever due to bending of the main body with an anti-node of the contact resonance between the first end and the island.

16. The method of claim 15, wherein the displacement has a first component in a first direction due to said bending, the method comprising using the first component of the displacement of the light spot to measure an effect of a force exerted on the probe tip by a surface of a sample on the sample platform.

17. The method of claim 16, wherein a position of a center of the probe tip is offset from said line and the displacement has a second component in a second direction corresponding to rotation of the island around said line, wherein the method comprises:
    controlling the actuator to move the cantilever and the platform relative to each other in a height direction perpendicular to the surface of the cantilever in a feedback loop in response to said second component of the displacement of the light spot.

18. The method of claim 15, wherein the probe tip and the sample exchange forces continuously.

* * * * *